3,173,965
AROMATIC LUBRICANTS AND THEIR METHOD OF PREPARATION
James J. Pappas, Elizabeth, and Fred H. Kant, Cranford, N.J., assignors to Esso Research and Engineering Company, a corporation of Delaware
No Drawing. Filed June 28, 1961, Ser. No. 120,176
10 Claims. (Cl. 260—667)

This invention relates to alkylated benzenes suitable for use as fluid lubricants, to their preparation and to their use.

Three of the most important properties of fluid lubricants, such as automotive crankcase lubricants, are viscosity, viscosity index, and pour point. For many lubricants, especially those used for internal combustion engines, the minimum desirable specifications are that the viscosity at 210° F. should be between 32 and 280 S.U.S.'s, they should have a pour point below about 35° F., and a viscosity index (Dean-Davis) above about 90. It has been customary in the art to modify lubricating oils with additives to meet or improve such specifications. The present invention resides in the techniques for preparing compositions which, even without such additives, have V.I., and pour point properties which are much better than even highly refined mineral oils.

The compositions of this invention can be used to lubricate internal combustion engines. They can also be used as special lubricants, e.g. transmission oils, refrigerator oils, instrument oils, jet lubricants and the like.

The compositions of the invention are prepared from benzene or alkylated benzenes. The preferred compositions of this invention are dialkylated benzenes, i.e. para-dialkylated benzenes. When dialkylated benzenes are desired, the alkylation can be accomplished by simultaneously reacting all of the alkyl reactants with benzene, but preferably it is accomplished by first completely reacting one alkyl reactant with benzene and then reacting the resulting reaction mixture with the other alkyl reactant. The preferred technique is to first alkylate benzene with one alkyl reactant, then separate the resultant monoalkylated benzene from the reaction mixture and alkylate it with the other alkyl reactant. The yields of desired dialkylated product are considerably higher when using the preferred technique. If monoalkylated benzenes are available, these can be used as a starting material. Consequently, only a single alkylation is necessary to achieve the desired dialkylated benzene product. The alkyl substituents can have from 4 to 21, e.g. 5 to 18 carbon atoms. When the monoalkylated benzene is desired, the alkyl substituent should have a minimum of 10 carbon atoms.

"Alkylation" as used herein means a process for introducing alkyl substituents onto a benzene residue in which the linkage is through the α-carbon atom of the alkyl substituent. It is preferably accomplished by any of the variations in the well-known Friedel-Crafts reaction. Thus, alkylation may be accomplished in the presence of a suitable inorganic halide Friedel-Crafts catalyst, such as $AlCl_3$, $AlBr_3$, $FeCl_3$, $SnCl_4$, $BF_3$, $ZnCl_2$, HF, $H_2SO_4$, $P_2O_5$, and $H_3PO_4$. α-Olefins, monohydroxylated or monohalogenated paraffins can be employed in the Friedel-Crafts reaction. Preferably the olefins and paraffins are normal when products having a high viscosity index are desired. These materials, when reacted with benzene in the Friedel-Crafts reaction, produce a material represented by:

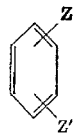

wherein Z is a $C_4$ to $C_{21}$, e.g. a $C_4$ to $C_{15}$ alkyl radical, and Z' is selected from the group consisting of H and $C_4$ to $C_{21}$, e.g. a $C_{10}$ to $C_{21}$ alkyl radical. Z and Z' are preferably para to each other. The preferred Friedel-Crafts reaction of this invention is carried out with an alpha olefin reactant and aluminum chloride catalyst. Preferably, the aluminum chloride ($AlCl_3$) is anhydrous and the reaction is preferably carried out in an anhydrous hydrogen chloride atmosphere. The hydrogen chloride atmosphere tends to rapidly drive the reaction to completion, but its use is not critical. The reaction can be carried out at any convenient temperature. However, temperatures between 30° and 100° F., e.g. 50° to 65° F., are preferred. The mole ratio of aromatic to any of the alkyl reactants can range from 0.1:1 to 10:1, e.g. 1:1 to 3:1. The molar proportion of catalyst is 0.01 to 0.20, e.g. 0.03 to 0.15, moles per mole of olefin reactant.

After the reaction is complete, the hydrocarbon layer of the reaction mixture is washed and then neutralized with a suitable neutralizing agent such as an aqueous sodium bicarbonate solution. Any unreacted benzene and alkyl reactant are removed by distillation and the alkylated product is fractionated to give the desired product. Usually the desired product is that which distills off above 700° F. at atmospheric pressure. That fraction distilling between 700° to 950° F. at atmospheric pressure is most desirable.

One of the outstanding features of the present invention is that alkyl substituents having certain chain lengths and certain degrees of branchiness can be selected to influence, predictably, a given desired property of the resulting product. Thus, by proper selection of the alkyl substituents, a final product having pour points ranging from −75° to +15° F., V.I.'s from 90 to 145, e.g. 105 to 145, and viscosities from 35 to 50 S.U.S. at 210° F. can be prepared.

Polyalkylated aromatics, monoalkylated aromatics, and dialkylated aromatics in the meta or ortho positions tend to have the least desirable lubricating properties. When branched olefin reactants are employed, the tendency of the resulting product is to have low pour points but also relatively low V.I.'s. Also, products having better pour point properties are those having two alkyl substituents having a total of at least 9 carbon atoms for both constituents. When the alkyl substituents have approximately equal numbers of carbon atoms but not less than about 8 per alkyl reactant, the tendency of the final product is to exhibit extremely low pour points and also relatively low V.I.'s. When one of the alkyl reactants has substantially more carbon atoms than the other, the tendency is to obtain higher V.I.'s and also somewhat higher pour points. This tendency is more pronounced when the minimum number of carbon atoms per alkyl substitutent is about 10 and there is a difference of from about 3 to 8 carbon atoms in the length of the longer alkyl reactant as compared with the length of the shorter alkyl reactant. When the number of carbon atoms in the shorter alkyl reactant ranges from 6 to 9 and there are from about 3 to 15 more carbon atoms in the longer alkyl reactant, the tendency is for the final product to have a relatively high V.I. and a high pour point, the trend increasing as the difference in the number of carbon atoms in each alkyl reactant approaches a maximum. As the number of carbon atoms in each of the alkyl reactants approaches the point where there will be the same number of carbon atoms in each alkyl reactant, but at least 10 per alkyl reactant, the V.I. tends to decrease while the pour point also tends to decrease. A further advantage of this invention is that compositions having very satisfactory lubricating properties can be prepared from somewhat impure commercial refinery streams as well as from pure reactants.

The alkylated benzenes of this invention can be further treated by hydrogenation if desired. By hydrogenating the alkylated benzenes it is possible to improve their stability to oxidation without appreciably affecting their other properties. Thus, there is virtually no change in V.I. and pour point and only a slight increase in viscosity after hydrogenation. Any conventional hydrogenation technique can be used. A preferred hydrogenation is carried out with a Harshaw Nickel on Keiselguhr catalyst at about 400° F. and at about 1000 p.s.i. above atmospheric.

The compositions of this invention can be used, per se, as lubricants. They can also, if desired, be used with conventional additives such as neutralized phosphosulfurized hydrocarbon detergents, zinc dialkyl dithiophosphate extreme pressure agents, trialkyl phenol antioxidants, and the like. The compositions of this invention can also be thickened to a grease consistency with conventional thickeners such as lithium 12-hydroxy stearate and calcium soap-calcium acetate complexes.

It will be apparent to one skilled in the art, from the above and from the following examples, how to prepare compositions having the particular property desired.

EXAMPLE I

A series of compositions was prepared by the following procedure. Benzene was placed in a four-necked flask equipped with stirrer, thermometer, and addition funnel to which was attached a gas bag containing anhydrous hydrogen chloride. The benzene was cooled to 55° F. at atmospheric pressure, the anhydrous aluminum chloride was added and stirring commenced. Hydrogen chloride gas was then squeezed from the gas bag into the reaction mixture. Olefin was gradually added dropwise over a period of one hour while the temperature of the reaction mass was held between 55° F. and 59° F. by using an ice bath. After all the olefin had been added to the reaction mixture, the mixture was stirred for an additional 10 to 15 minutes. The reaction mixture was then transferred to a separatory funnel where sludge was allowed to settle and removed. The resultant hydrocarbon layer was washed several times with water, followed by washing with a 5 wt. percent aqueous sodium bicarbonate solution and followed with additional water washing until neutral. The unreacted benzene and olefin were removed by distillation. The monoalkylated benzene product was distilled. A second alkylation was carried out by following the same general procedure and using the monoalkylated product just obtained in place of benzene. The dialkylated benzene was fractionated at a pressure of from 0.1 to 0.2 mm. of mercury to give a product boiling above 750° F. at atmospheric pressure. The product boiling above 750° F. at atmospheric pressure was further fractionated at a pressure of from 0.1 to 0.2 mm. of mercury to produce a final product boiling between 750° to 950° F. at atmospheric pressure.

In several of the compositions, the olefins used were obtained from cracked petrolatum and cracked wax. These olefins were obtained by fractionating the gross product from steam cracking of petrolatum and/or wax derived from North Louisiana crude. The olefin cuts represent the $C_6$–$C_{21}$ fractions of the steam cracked product having a boiling range of from 130° to 690° F. at atmospheric pressure.

For each run, two compositions were obtained. These were designated by a letter and a letter prime. The two compositions represent (1) the product boiling above 750° F., and (2) the product boiling between 750° to 950° F.

EXAMPLE II

A series of compositions was prepared using the procedure of Example I except that there was just one alkylation step. Two products were evaluated for each run. These were the product boiling above 700° F. and the product boiling between 700° to 950° F. Thirty-six compositions were prepared in this manner and labelled as described for Example I. The kerosene extract used in this example was obtained in a 20% yield from a whole kerosene fraction by selective extraction with $SO_2$. The extract consisted of approximately 25% saturates and 75% aromatics which were predominantly $C_9$–$C_{12}$ polyalkylated benzenes.

The details relative to the compositions of Examples I and II are summarized in the following tables.

*Table I–1*

DIALKYLATION OF BENZENE

First Alkylation

| Composition | A/A′ | B/B′ | C/C′ | D/D′ | E/E′ | F/F′ | G/G′ | H/H′ |
|---|---|---|---|---|---|---|---|---|
| Reactants: | | | | | | | | |
| Benzene, gms | 624 | 624 | 624 | 322 | 624 | 624 | 624 | 624 |
| Olefin: | | | | | | | | |
| Type | $C_6$ | $C_8$ | $C_8$ | $C_{12}$ | $C_6$–$C_9$ | $C_{10}$–$C_{15}$ | $C_{10}$–$C_{15}$ | $C_{10}$–$C_{15}$ |
| Purity | | Pure | | | | 2 Cracked Wax | | |
| Amount, gms | 336 | 449 | 449 | 346 | 420 | 700 | 700 | 700 |
| $AlCl_3$, gms.[1] | 53.2 | 53.2 | 53.2 | 27.6 | 26.6 | 26.6 | 26.6 | 26.6 |
| Conditions: | | | | | | | | |
| Reaction Temp., °F | 55–59 | 55–59 | 55–59 | 55–59 | 55–59 | 55–59 | 55–59 | 55–59 |
| Reaction Time, Min | 70 | 70 | 70 | 75 | 75 | 75 | 75 | 75 |
| Monoalkylated Benzene: | | | | | | | | |
| BP, °F | 400–420 | 470–490 | 470–490 | 580–600 | 375–550 | 500–700 | 500–700 | 500–700 |
| Amount, gms | 432 | 547 | 529 | 224 | 318 | 475 | 433 | 475 |

[1] An HCl blanket was over the reaction mixture.
[2] Contains 86% monoolefins, 8% diolefins, 6% aromatics.

Table I-2
DIALKYLATION OF BENZENE
Second Alkylation

| Composition | A/A' | B/B' | C/C' | D/D' | E/E' | F/F' | G/G' | H/H' |
|---|---|---|---|---|---|---|---|---|
| Reactants: | | | | | | | | |
| Monoalkylated Benzene, gms | 200.0 | 200.0 | 240.0 | 220.0 | 299.0 | 474.5 | 432.4 | 475.0 |
| Olefin: | | | | | | | | |
| Type | $C_{18}$ | $C_{18}$ | $C_{18}$ | $C_{12}$ | $C_{16}$-$C_{21}$ | $C_{10}$-$C_{15}$ | $C_{18}$ | $C_{16}$-$C_{21}$ |
| Purity | Pure | Pure | (1) | Pure | (2) | (2) | Pure | (2) |
| Amount, gms | 155.5 | 133.2 | 160.0 | 76.0 | 205.9 | 165.0 | 215.5 | 244.0 |
| $AlCl_3$, gms[3] | 8.2 | 7.0 | 16.8 | 6.0 | 10.9 | 12.5 | 11.4 | 12.6 |
| Conditions: | | | | | | | | |
| Reaction Temp., °F | 55-59 | 55-59 | 55-59 | 55-59 | 55-59 | 55-59 | 55-59 | 55-59 |
| Reaction Time, Min | 70 | 70 | 70 | 75 | 75 | 75 | 75 | 75 |
| Products: | | | | | | | | |
| HC after Wash, gms | 308.5 | 277.0 | 319.5 | 235.6 | 405.7 | 530.6 | 597.5 | 478.0 |
| Sludge, gms | 7.5 | 12.0 | 59.0 | 14.5 | 42.3 | 28.6 | 9.0 | 52.0 |
| Dist. of Prod., gms.: | | | | | | | | |
| <750° F | 123.5 | 90.1 | 177.5 | 105.7 | 160.2 | 234.6 | 211.5 | 194.0 |
| 750-950° F | 144.7 | 155.1 | 127.2 | 110.6 | 194.0 | 236.8 | 314.2 | 146.8 |
| >950° F | 40.3 | 31.8 | 14.8 | 19.3 | 51.5 | 59.2 | 71.8 | 137.2 |
| Insp. of 750° F.+ Prod.: | | | | | | | | |
| Visc. at 210° F., SSU | 44.7 | 43.3 | 47.2 | 42.5 | 48.4 | 47.3 | 47.6 | 56.4 |
| V.I. | 132 | 129 | 114 | 120 | 115 | 120 | 127 | 120 |
| Pour Point, °F | +25 | +20 | -25 | -35 | -15 | -65 | +5 | -15 |
| Insp. of 750-950° F. Prod.: | | | | | | | | |
| Visc. at 210° F., SSU | 41.6 | 43.0 | 45.2 | 40.9 | 43.4 | 41.6 | 46.0 | 47.4 |
| V.I. | 127 | 126 | 109 | 113 | 112 | 112 | 125 | 118 |
| Pour Point, °F | +15 | 0 | -30 | -40 | -25 | <-75 | -9 | -30 |

[1] Cracked Petrolatum.  [2] Cracked Wax.  [3] An HCl blanket was over the reaction mixture.

Table I-3
MONOALKYLATION OF AROMATICS

| Composition | I/I' | J/J' | K/K' | L/L' | M/M' | N/N' | O/O' | P/P' | Q/Q' |
|---|---|---|---|---|---|---|---|---|---|
| Reactants: | | | | | | | | | |
| Aromatic Compound: | | | | | | | | | |
| Type | n-Butylbenzene | n-Butylbenzene | n-Butylbenzene | Toluene | (1) | Benzene | p-Xylene | Mesitylene | (2) |
| Amount, gms | 134.2 | 268.4 | 247.1 | 184.2 | 268.4 | 156.2 | 212.3 | 240.4 | 358.0 |
| 1-Octadecene: | | | | | | | | | |
| Type | | | | | [3] Pure | | | | |
| Amount, gms | 252.5 | 252.5 | 233.0 | 252.5 | 252.5 | 252.5 | 252.5 | 252.5 | 252.5 |
| $AlCl_3$, gms.[4] | 13.3 | 13.3 | 12.3 | 13.3 | 13.3 | 13.3 | 13.3 | 13.3 | 13.3 |
| Conditions: | | | | | | | | | |
| Reaction Temp., °F | 55-59 | 55-59 | 28-32 | 55-59 | 55-59 | 55-59 | 55-59 | 55-59 | 55-59 |
| Reaction Time, Min | 70 | 70 | 42 | 70 | 70 | 70 | 70 | 70 | 70 |
| Products: | | | | | | | | | |
| HC after Wash, gms | 382.5 | 474.3 | 477.4 | 309.0 | 415.4 | 287.0 | 376.2 | 413.0 | 501.1 |
| Sludge, gms | 12.2 | 33.8 | 8.4 | 29.4 | 25.7 | 29.8 | 35.0 | 30.8 | 31.0 |
| Dist. of Prod., gms.: | | | | | | | | | |
| <700° F | 38.0 | 128.3 | 145.4 | 72.0 | 115.0 | 60.3 | 89.7 | 122.5 | 207.0 |
| 700-950° F | 218.5 | 306.2 | 259.7 | 211.2 | 289.3 | 185.4 | 262.4 | 278.9 | 274.0 |
| >950° F | 126.0 | 39.8 | 72.3 | 25.8 | 11.1 | 41.3 | 24.1 | 11.6 | 20.0 |
| Insp. of 700° F.+Prod.: | | | | | | | | | |
| Visc. at 210° F., SSU | 47.4 | 40.9 | 43.1 | 39.6 | 39.6 | 38.9 | 40.2 | 39.6 | 41.8 |
| V.I. | 143 | 144 | 145 | 132 | 126 | 143 | 102 | 133 | 122 |
| Pour Point, °F | +45 | +30 | +40 | +40 | +25 | +35 | +15 | +35 | +25 |
| Insp. of 700-950° F. Prod.: | | | | | | | | | |
| Visc. at 210° F., SSU | 40.4 | 40.1 | 40.0 | 38.4 | 39.4 | 36.6 | 39.4 | 38.7 | 40.5 |
| V.I. | 139 | 137 | 143 | 116 | 121 | 120 | 91 | 127 | 115 |
| Pour Point, °F | +16 | +11 | +16 | +20 | 0 | +23 | +2 | +25 | +14 |

[1] s-Butylbenzene.  [2] Kerosene Extract.  [3] Olefins purchased from Humphrey-Wilkinson, Inc., North Haven, Conn.  [4] An HCl blanket was over the reaction mixture.

Table I-4
MONOALKYLATION OF AROMATICS

| Composition | R/R' | S/S' | T/T' | U/U' | V/V' | W/W' | X/X' | Y/Y' | Z/Z' |
|---|---|---|---|---|---|---|---|---|---|
| Reactants: | | | | | | | | | |
| Aromatic Compound: | | | | | | | | | |
| Type | Kerosene Extract | Kerosene Extract | Kerosene Extract | Kerosene Extract | s-Butylbenzene | s-Butylbenzene | s-Butylbenzene | Benzene | Tetralin |
| Amount, gms | 358.0 | 358.0 | 358.0 | 358.0 | 268.4 | 268.4 | 268.4 | 156.2 | 264.4 |
| 1-Octadecene: | | | | | | | | | |
| Type | Cracked Petrolatum | Cracked Petrolatum | Cracked Petrolatum | Cracked Petrolatum | [4] Pure | [3] Cracked Petrolatum | [3] Cracked Petrolatum | | [2] Pure |
| Amount, gms | 252.5 | 252.5 | 252.5 | 252.5 | 252.5 | 252.5 | 252.5 | 252.5 | 252.5 |
| $AlCl_3$, gms.[4] | 13.3 | 26.6 | 13.3 | 13.3 | 6.6 | 26.6 | 26.6 | 26.6 | 13.3 |
| Conditions: | | | | | | | | | |
| Reaction Temp., °F | 55-59 | 55-59 | 55-59 | 86-90 | 55-59 | 55-59 | 55-59 | 55-59 | 55-59 |
| Reaction Time, Min | 70 | 70 | 150 | 70 | 70 | 70 | 70 | 70 | 70 |
| Products: | | | | | | | | | |
| HC after Wash, gms | 471.5 | 464.5 | 496.0 | 501.0 | 403.0 | 383.0 | 362.5 | 239.5 | 400.0 |
| Sludge, gms | 45.0 | 77.5 | 46.0 | 48.0 | 17.0 | 86.0 | 76.8 | 97.2 | 0 |
| Dist. of Prod., gms.: | | | | | | | | | |
| <700° F | 284.0 | 218.5 | 272.0 | 266.5 | 87.0 | 172.5 | 153.5 | 123.8 | 105.0 |
| 700-950° F | 162.7 | 226.8 | 204.9 | 212.9 | 288.5 | 190.3 | 174.4 | 75.1 | 234.3 |
| >950° F | 24.8 | 19.2 | 19.1 | 21.6 | 27.5 | 20.2 | 34.6 | 40.6 | 60.7 |
| Insp. of 700° F.+Prod.: | | | | | | | | | |
| Visc. at 210° F., SSU | 44.6 | 43.1 | 43.4 | 39.6 | 40.4 | 41.1 | 42.6 | 46.0 | 47.8 |
| V.I. | 98 | 92 | 105 | 91 | 129 | 111 | 121 | 117 | 111 |
| Pour Point, °F | +5 | -10 | +10 | +5 | +20 | +5 | -5 | +5 | +40 |
| Insp. of 700-950° F. Prod.: | | | | | | | | | |
| Visc. at 210° F., SSU | 42.5 | 42.0 | 42.8 | 38.8 | 39.4 | 39.9 | 40.0 | 36.6 | 44.5 |
| V.I. | 90 | 85 | 94 | 88 | 123 | 103 | 113 | 106 | 106 |
| Pour Point, °F | -15 | -20 | -6 | -5 | +13 | -8 | -15 | -7 | +20 |

[1] n-Butylbenzene.
[2] Olefins purchased from Humphrey-Wilkinson, Inc., North Haven, Conn.
[3] Contains 78% monoolefins, 7% paraffins, 4% diolefins, 11% aromatics.
[4] An HCl blanket was over the reaction mixture.

Compositions N/N' demonstrate that a monoalkylated benzene exhibits fair lubricating properties especially with respect to V.I. The dialkylated compounds demonstrate the range of materials having different lubricating properties which can be obtained. Composition F/F' is an example of a material with an outstandingly low pour point. Composition A' is an example of a material with an excellent V.I. but only an average pour point. Composition H' is an example of a material with both a good V.I. and a good pour point.

Compositions L/L', O/O', and P/P' are in the nature of comparative compositions. They demonstrate that the alkylated benzenes having relatively short chains, i.e., less than 4 carbon atoms and more than two alkyl substituents per benzene ring do not have the excellent all-around properties of the compositions of the invention.

EXAMPLE III

The 750° to 950° F. fraction from the dialkylation of benzene with the $C_{10}$ to $C_{15}$ cracked wax olefins (composition F') was hydrogenated over a reduced Harshaw Chemical Co. nickel catalyst on kieselguhr at 400° F. and 1000 p.s.i. until an almost theoretical uptake of hydrogen was observed. One weight percent of phenyl-α-naphthylamine was added to the hydrogenated material obtained and to composition F'. The material obtained and composition F' were then evaluated with respect to several conventional properties. The results obtained are summarized below in Table II.

Table II

|  | Composition F' | Hydrogenated Composition F' |
|---|---|---|
| Pour Point, °F | <−75 | <−75 |
| Cloud Point, °F | <−75 | <−75 |
| Viscosity at 210° F., cs | 4.680 | 5.850 |
| Viscosity at 100° F., cs | 26.94 | 38.52 |
| V.I. | 98 | 102 |
| Corrosion and oxidation stability at 347° F.: * | | |
| Corrosion, mg./cm.$^2$ | <±0.2 | <±0.2 |
| Oxidation: | | |
| Viscosity change, percent | 38 | <15 |
| Total acid No | 6.0 | <2.0 |

*This test was carried out by immersing weighted strips of copper, magnesium, iron, aluminum and silver in 100 cc. of the sample which was maintained at 347° F. for 72 hours while bubbling 0.5 liters per hour of air through the sample. The metal strips are then reweighed to determine the weight change in mg./cm.$^2$. The change in viscosity and the neutralization number of the sample is also determined. None of the strips exhibited a weight change of more than ±0.2 mg./cm.$^2$.

As can be seen from the above Table II, the change in viscosity of the hydrogenated material is very small compared with the unhydrogenated material. There is also a considerable improvement in acid number.

What is claimed is:
1. A method for preparing dialkylated benzene compounds useful as lubricants which compounds have a Dean-Davis viscosity index of at least 90, a pour point of less than about +15° F. and boil from 700 to 950° F. which method comprises:
   (I) alkylating a mono-alkyl substituted benzene nucleus in a Friedel-Crafts reaction with an alpha olefin to form a para dialkyl substituted benzene nucleus
      (a) wherein the first alkyl substituent on said para substituted benzene nucleus contains 4 to 15 carbon atoms and the second alkyl substituent contains from 10 to 21 carbon atoms, said second alkyl substituent containing at least as many carbon atoms as said first alkyl substituent,
   (II) separating that portion of the reaction product boiling in the range of 700 to 950° F., said separated portion having a pour point of less than +15° F. and a Dean-Davis viscosity index of at least 90,
   (III) hydrogenating said separated portion of said reaction product, and
   (IV) recovering said dialkylated benzene compounds useful as lubricants.

2. A method according to claim 1 wherein the minimum number of carbon atoms in either substituent is 10 and there are from 3 to 8 more carbon atoms in one alkyl substituent than in the other.

3. The composition produced by the method of claim 2.
4. The composition produced by the method of claim 1.
5. A method for preparing dialkylated benzene materials useful as lubricating compositions, which materials have a Dean-Davis viscosity index of at least 90, a pour point of less than +15° F. and boil from 700° F. to 950° F., the method which comprises:
   (a) alkylating a mono-alkyl substituted benzene nucleus in a Friedel-Crafts reaction with a member selected from the group consisting of alpha olefins, hydroxylated paraffins and halogenated paraffins to form a reaction product containing a para substituted dialkyl benzene nucleus wherein the first alkyl substituent on said benzene nucleus contains 4 to 15 carbon atoms and the second alkyl substituent contains from 10 to 21 carbon atoms, said substituents each containing not less than 8 carbon atoms when said substituents have an equal number of carbon atoms, and the longer substituent having at least 3 more carbon atoms than the shorter substituent when said substituents are of unequal length and said shorter substituent contains less than 10 carbon atoms, said second alkyl substituent always being the longer substituent when said substituents are of unequal length, and
   (b) separating and recovering that portion of the reaction product boiling between about 700–950° F., said separated portion comprising said para dialkyl substituted benzene nucleus and having a viscosity index of at least 90 and a pour point of less than +15° F. and hydrogenating said separated portion.

6. A method as defined in claim 5 wherein said selected member is an alpha olefin.
7. A method as defined in claim 5 wherein said Friedel-Crafts reaction is catalyzed with an aluminum chloride catalyst.
8. The composition produced by the method of claim 5.
9. The composition produced by the method of claim 6.
10. The composition produced by the method of claim 7.

References Cited in the file of this patent

UNITED STATES PATENTS

| 2,141,593 | Clarke et al. | Dec. 27, 1938 |
| 2,475,970 | Lieber et al. | July 12, 1949 |
| 2,529,191 | Rocchini et al. | Nov. 7, 1950 |
| 2,861,111 | Scriabine et al. | Nov. 18, 1958 |
| 2,887,518 | Bloch et al. | May 19, 1959 |

FOREIGN PATENTS

| 611,040 | Great Britain | Oct. 25, 1958 |